(12) United States Patent
Shaw et al.

(10) Patent No.: US 6,481,543 B1
(45) Date of Patent: Nov. 19, 2002

(54) ZERO DRAG DISC BRAKE WITH ANTI-KNOCK-BACK DEVICE

(75) Inventors: Schuyler Scott Shaw, Dayton, OH (US); Bryan Peter Riddiford, Dayton, OH (US); John Benjamin Hageman, Vandalia, OH (US); Donald Edward Schenk, Vandalia, OH (US); David Bernard Drennen, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/633,942

(22) Filed: Aug. 8, 2000

(51) Int. Cl.⁷ .............................................. F16D 55/02
(52) U.S. Cl. .................. 188/71.9; 188/72.3; 188/72.6; 188/196 V
(58) Field of Search ........................ 188/71.7, 71.8, 188/71.9, 72.1, 72.3, 72.4, 72.6, 72.7, 72.8, 196 R, 196 D, 196 V

(56) References Cited

U.S. PATENT DOCUMENTS

| | | | | |
|---|---|---|---|---|
| 3,860,095 A | * | 1/1975 | Morris ...................... | 188/71.8 |
| 4,381,047 A | | 4/1983 | Gregoire et al. | |
| 4,540,068 A | * | 9/1985 | Ritsema ...................... | 188/71.8 |
| 4,602,702 A | * | 7/1986 | Ohta et al. .................. | 188/71.7 |
| 5,148,894 A | * | 9/1992 | Eddy, Jr .................... | 188/72.6 |
| 5,161,650 A | | 11/1992 | Taig .......................... | 188/71.9 |
| 5,219,047 A | | 6/1993 | Fouilleux et al. .......... | 188/71.9 |
| 5,443,141 A | * | 8/1995 | Thiel et al. ................. | 188/71.9 |
| 5,628,387 A | * | 5/1997 | Schantzen ................... | 188/71.9 |
| 6,000,507 A | * | 12/1999 | Behm et al. ................ | 188/71.8 |
| 6,145,633 A | * | 11/2000 | Niederstadt et al. ........ | 188/71.8 |
| 6,250,434 B1 | * | 6/2001 | Baumgartner et al. ..... | 188/71.8 |

* cited by examiner

Primary Examiner—Pam Rodriguez
Assistant Examiner—Thomas J. Williams
(74) Attorney, Agent, or Firm—Robert M. Sigler

(57) ABSTRACT

A disc brake caliper assembly is provided that includes a housing having a bore. A piston is arranged within the bore and is movable between normal retracted and knock-back positions. A linkage is adjacent to the piston and is movable between first and second positions with a clearance between the piston and the linkage in the first position. The clearance undesirably permits the piston to move to the knock-back position during severe operating conditions. An actuator, which also may be used as part an electric parking brake, moves the linkage from the first position to the second position to eliminate the clearance when the linkage is moved from the first position to the second position where the linkage abuts the piston. The linkage is connected to the caliper housing by a support. The linkage prevents the piston from moving from the normal retracted position to the knock-back position. In operation, the present invention prevents piston knock-back by sending an adjustment signal from a controller to the actuator at a predetermined interval. The signal commands the actuator to move a linkage from the first to the second position where the linkage abuts the piston. In this manner, the linkage prevents the piston from moving from a normal retracted position to a knock-back position.

9 Claims, 1 Drawing Sheet

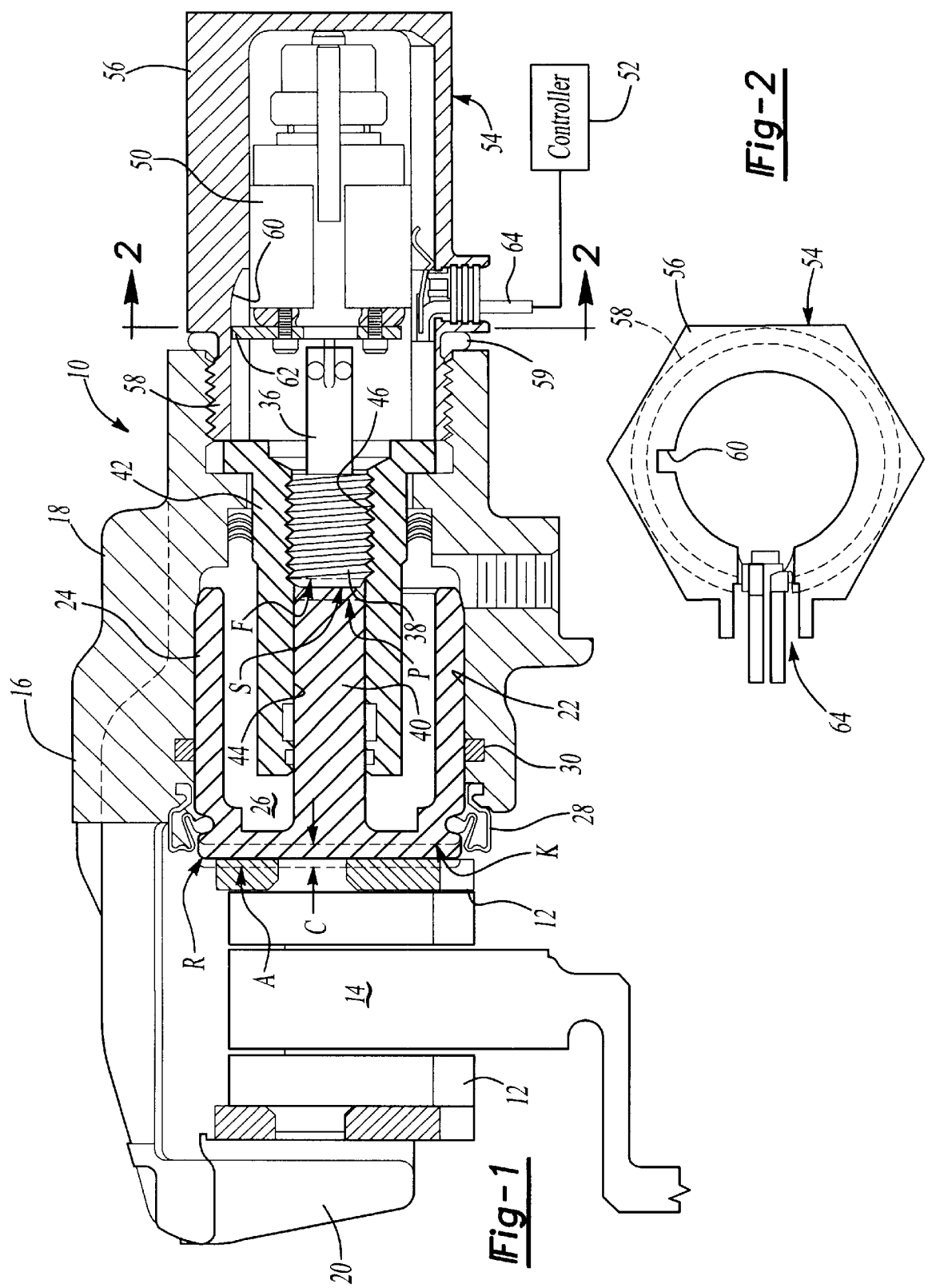

ZERO DRAG DISC BRAKE WITH ANTI-KNOCK-BACK DEVICE

TECHNICAL FIELD

This invention relates to a disc brake caliper assembly, and more specifically, the invention relates to a disc brake caliper assembly that prevents piston knock-back.

BACKGROUND OF THE INVENTION

Disc brake caliper assemblies are widely used in the automotive industry for applying a braking force to the wheels of a vehicle. The wheels are secured to a brake rotor, which has brake pads arranged on either side of its braking surfaces. A piston supported in the caliper housing forces the pads together and into engagement with the rotor when the vehicle operator depresses the brake pedal. Ideally, the brake pads do not engage the rotor when the brakes are not applied, which is a condition known as zero drag, so that frictional losses that reduce fuel economy are prevented. Typically, a retraction seal is used between the caliper housing and the piston to automatically retract the piston when the brakes are not applied.

Under severe operating conditions, the rotor may deflect due to vibrations or harsh road inputs. A deflected rotor may push back on the brake pads and force the piston into the caliper housing. As a result, an undesirable clearance between the rotor and brake pad may be created which increases the distance the operator must depress the brake pedal. Passive anti-knock-back devices have been employed, such as resilient rings, to prevent the piston from being forced into the caliper housing. However, as with many passive devices, the prior anti-knock-back device lacks fine control and responsiveness.

Electric parking brake actuators have been used to replace the mechanical devices typically employed to apply the parking brake. The electric actuators lock the piston in place once the brake pads have been forced together about the rotor. However, these actuators have been underutilized in that they only have been used for the limited purpose of applying the parking brake. Therefore, what is needed is an active anti-knock-back device that also may be incorporated into the electric parking brake actuator.

SUMMARY OF THE INVENTION

The present invention provides a disc brake caliper assembly that includes a housing having a bore. A piston is arranged within the bore and is movable between normal retracted and knock-back positions. A linkage is adjacent to the piston and is movable between first and second positions with a clearance between the piston and the linkage in the first position. The clearance undesirably permits the piston to move to the knock-back position during severe operating conditions. An actuator, which also may be used as part an electric parking brake, moves the linkage from the first position to the second position to eliminate the clearance when the linkage is moved from the first position to the second position where the linkage abuts the piston. The linkage is connected to the caliper housing by a support. The linkage prevents the piston from moving from the normal retracted position to the knock-back position.

In operation, the present invention prevents piston knock-back by sending an adjustment signal from a controller to the actuator at a predetermined interval. The signal commands the actuator to move a linkage from the first to the second position where the linkage abuts the piston. In this manner, the linkage prevents the piston from moving from a normal retracted position to a knock-back position.

Accordingly, the above invention provides an active anti-knock-back device that also may be incorporated into the electric parking brake actuator

BRIEF DESCRIPTION OF THE DRAWINGS

Other advantages of the present invention can be understood by reference to the following detailed description when considered in connection with the accompanying drawings wherein:

FIG. 1 is a cross-sectional view of the disc brake caliper assembly of the present invention; and FIG. 2 is a cross-sectional view of an actuator housing taken along line 2—2 of FIG. 1.

DESCRIPTION OF THE PREFERRED EMBODIMENT

A disc brake caliper assembly 10 is shown in FIG. 1. The assembly 10 carries a pair of spaced apart brake pads 12 that are arranged on either side of a rotor 14. A wheel (not shown) is secured to rotor 14 so that as frictional force is applied to rotor 14 by brake pads 12 friction will increase between the wheel's tire and the roadway thereby slowing the vehicle. Caliper assembly 10 includes a body 16 having a housing 18 and a flange 20 opposite the housing 18, which supports one of the brake pads 12. Housing 18 includes a bore 22 with a piston 24 disposed therein. The other brake pad 12 is supported adjacent to piston 24.

A dust seal 28 is arranged between housing 18 and piston 24 for preventing debris from entering bore 22 and interfering with the operation of caliper assembly 10. Piston 24 and bore 22 define a hydraulic brake chamber 26. When the operator applies the brake pedal, hydraulic fluid fills chamber 26 forcing piston 24 from bore 22 to squeeze rotor 14 with brake pads 12 and create a frictional braking force. A retraction seal 30 is arranged between piston 24 and housing 18 to retract the piston from an applied position, A, in which brake pads 12 engage rotor 14 to a normal retracted position, R, once the brake pedal has been released. In the normal retracted position, R, piston 24 does not force brake pads 12 into engagement with rotor 14. Retraction seal 30 ensures that piston 24 is sufficiently pulled away from rotor 14 such that brake pads 12 do not "drag" against rotor 14 to prevent frictional losses.

As discussed above, severe operating conditions may force piston 24 into bore 22 to a knock-back position, K, resulting in an undesirable clearance, C. On the next brake application, the operator will have to depress the brake pedal much farther than desired to fill chamber 26 with sufficient fluid to apply the brakes. To prevent piston 24 from being forced from the normal retracted position, R, to the knock-back position, K, the present invention incorporates a linkage 36. Linkage 36, preferably a shaft with a threaded end 38, is arranged adjacent to piston 24 and movable between first, F, and second, S, positions. Specifically, a rod 40 is integrally formed with piston 24 and extends therefrom toward end 38. A support 42 is secured to housing 18 within bore 22 for supporting linkage 36. Support 42 has a hole 44 for at least partially receiving rod 40 and a threaded portion 46 for threadingly receiving end 38 of linkage 36.

As brake pads 12 wear, a clearance will result between rod 40 and linkage 36 that corresponds to the clearance, C, between the normal retracted position, R, and the knock-back position, K. The clearance between rod 40 and linkage 36 defines first position, F, of linkage 36. While linkage 36 is in the first position, F, piston 24 is able to move to the knock-back position, K, in the same undesirable manner as the prior art.

An actuator 50 is used to rotatingly drive linkage 36 to eliminate the clearance between rod 40 and linkage 36 by moving linkage 36 from the first position, F, to the second position, S. In the second position, linkage 36 abuts rod 40. Since linkage 36 is supported by support 42, which is secured to housing 18, rod 40 is prevented from moving inwardly relative to housing 18. In this manner, actuator 50 eliminates the clearance to prevent piston 24 from moving within bore 22 away from rotor 14 from the normal retracted position, R, to the knock-back position, K, in response to severe operating conditions.

Preferably, actuator 50 is an electric motor commanded by a controller 52. Actuator 50 is supported by an actuator housing 54 that includes a body 56 with a hexagonal cross-section and a threaded end 58 fastened to housing 18. A seal 59 is arranged between actuator housing 54 and housing 18 to prevent hydraulic fluid leakage. Actuator housing 54 secures support 42 to housing 18. The interior of actuator housing 54 has a key way 60 that receives a key 62 which is secured to actuator 50 to prevent rotation of actuator 50 relative to actuator housing 54. As actuator 50 drives linkage 36, actuator 50 moves axially within actuator housing 54 and relative to support 42.

Controller 52 is electrically connected to actuator 50 at electrical connector 64. Connector 64 is shown rotated 90° in FIG. 1 for clarity. In operation, piston knock-back is prevented with the present invention by sending an adjustment signal from controller 52 to actuator 50 at a predetermined interval. Actuator 50 moves linkage 36 from the first, F, to the second, S, position in response to the adjustment signal. Linkage 36 abuts piston 24 to prevent piston 24 from moving from the normal retracted position, R, to the knock-back position, K. Actuator 50 is a relatively weak electric motor. Specifically, actuator 50 has insufficient power to force piston 24 past retraction seal 30 when rotatingly driving linkage 36. As a result, actuator 50 experiences a stall condition once linkage 36 has reached the second position, S, and linkage 36 abuts rod 40. Accordingly, the adjustment signal is terminated when actuator 50 reaches the stall condition.

The present invention may also be used as an electric parking brake. Linkage 36 further includes a park brake position, P, which is adjacent to the second position, S, and opposite the first position, F. During a parking brake sequence, controller 52 commands actuator 50 to move linkage 36 from either the first, F, or the second, S, positions to the park brake position, P, upon controller 52 receiving a park brake apply signal. The park brake apply signal may come from a switch located in the vehicle cabin that is operable by the vehicle operator. Known electric park brake actuator sequences drive a member against the piston after the brakes have been applied by hydraulic fluid to lock the brake pads against the rotor. The parking brake is deactivated when the controller commands the actuator to move linkage 36 from the park brake position, P, to the first, F, or second, S, position upon controller 52 receiving a park brake release signal from the switch. With electric parking brake systems as in the one described above, it is preferable that linkage 36 be adjusted from the first position, F, to the second position, S, subsequent to receiving the park brake release signal. In this manner, linkage 36 will be regularly adjusted to accommodate brake pad 12 wear.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A disc brake caliper assembly comprising:

a housing having a bore;

a piston disposed within said bore movable between applied, retracted and knock-back positions, said piston being activatable by hydraulic pressure to move from the retracted position to the applied position;

a retracting seal effective in the absence of the hydraulic pressure to move the piston from the applied position to the retracted position;

a linkage adjacent to said piston;

an actuator moving said linkage from a first position to a second position in which it abuts the piston when the piston is in the retracted position and maintaining the actuator in the second position to prevent said piston from moving from said normal retracted position to said knock-back position, wherein said actuator is an electric motor for rotatingly driving said linkage.

2. The assembly according to claim 1, further including a controller electrically connected to said actuator, said controller commanding said actuator to move said linkage from said first position to said second position at a predetermined interval.

3. The assembly according to claim 2, wherein said linkage further includes a park brake position, said controller commanding said actuator to move said linkage from one of said first and second positions to said park brake position upon said controller receiving a park brake apply signal, said controller commanding said actuator to move said linkage from said park brake position to said one of said first and second position upon said controller receiving a park brake release signal.

4. A disc brake caliper assembly comprising:

a housing having a bore;

a piston disposed within said bore movable between applied, retracted and knock-back positions, said piston being activatable by hydraulic pressure to move from the retracted position to the applied position;

a retracting seal effective in the absence of the hydraulic pressure to move the piston from the applied position to the retracted position;

a linkage adjacent to said piston;

an actuator moving said linkage from a first position to a second position in which it abuts the piston when the piston is in the retracted position and maintaining the actuator in the second position to prevent said piston from moving from said normal retracted position to said knock-back position; and a support secured to said housing and interposed between said piston and said actuator, said support holding said linkage, wherein said piston includes a rod supported thereon and a shaft adjacent to said rod driven by said actuator and wherein said rod is integrally formed with said piston.

5. A disc brake caliper assembly comprising:

a housing having a bore;

a piston disposed within said bore movable between applied, retracted and knock-back positions, said piston being activatable by hydraulic pressure to move from the retracted position to the applied position;

a retracting seal effective in the absence of the hydraulic pressure to move the piston from the applied position to the retracted position;

a linkage adjacent to said piston;

an actuator moving said linkage from a first position to a second position in which it abuts the piston when the piston is in the retracted position and maintaining the actuator in the second position to prevent said piston from moving from said normal retracted position to said knock-back position; and a support secured to said housing and interposed between said piston and said actuator, said support holding said linkage, wherein said piston includes a rod supported thereon and a shaft adjacent to said rod driven by said actuator and wherein said rod and said shaft are at least partially disposed within a hole in said support.

6. The assembly according to claim 5, wherein said shaft is threadingly received within said hole.

7. The assembly according to claim 6, wherein said actuator moves axially relative to said support when moving said linkage from said first position to said second position.

8. The assembly according to claim 7, further including an actuator housing with said actuator disposed within said housing and splined to said housing against rotation relative thereto.

9. A method of preventing piston knock-back in a disc brake caliper assembly, the method comprising the steps of:

a) applying a hydraulic pressure to activate a piston in a first direction from a retracted position in which a brake pad is spaced from a brake disc to an applied position in which the brake pad is engaged with the brake disc for braking and in which a retracting seal is resiliently distorted;

b) releasing the hydraulic pressure to permit the retracting seal to move the piston in a second direction opposite the first direction to the retracted position;

c) in response to an adjustment signal, moving a linkage in the first direction from a first position to a second position abutting the piston when the piston is in its retracted position;

d) terminating the adjustment signal when the actuator reaches a stall condition; and e) maintaining the linkage in the second position to prevent piston knock-back movement in the second direction past the retracted position.

* * * * *